(12) United States Patent
Adler et al.

(10) Patent No.: US 6,934,165 B2
(45) Date of Patent: Aug. 23, 2005

(54) LOOSELY COUPLED PARALLEL RESONANT CONVERTER

(75) Inventors: Richard John Adler, Albuquerque, NM (US); Bruce Ashcraft, Albuquerque, NM (US); Robert J Richter-Sand, Albuquerque, NM (US)

(73) Assignee: North Star Power Engineering, Inc., Albuquerque, NM (US)

( * ) Notice: Subject to any disclaimer, the term of this patent is extended or adjusted under 35 U.S.C. 154(b) by 172 days.

(21) Appl. No.: 10/357,200

(22) Filed: Feb. 4, 2003

(65) Prior Publication Data

US 2004/0208025 A1 Oct. 21, 2004

(51) Int. Cl.⁷ .............................................. H02M 3/335
(52) U.S. Cl. ............................ 363/17; 363/60; 363/132
(58) Field of Search ............................... 363/15, 16, 17, 363/59, 60, 131, 132

(56) References Cited

U.S. PATENT DOCUMENTS

| | | | |
|---|---|---|---|
| 3,450,996 A | | 7/1969 | Abramvan et al. |
| 4,184,197 A | | 1/1980 | Cuk et al. |
| 5,124,658 A | | 6/1992 | Adler |
| 5,157,593 A | * | 10/1992 | Jain .............................. 363/17 |
| 5,555,494 A | * | 9/1996 | Morris .......................... 363/17 |
| 5,909,362 A | * | 6/1999 | Adams .................... 363/21.03 |
| 6,163,242 A | | 12/2000 | Crewson et al. |
| 6,246,599 B1 | * | 6/2001 | Jang et al. ................... 363/132 |
| 6,418,038 B2 | * | 7/2002 | Takahama et al. ............. 363/17 |

* cited by examiner

Primary Examiner—Adolf Berhane
(74) Attorney, Agent, or Firm—Dennis F. Armijo

(57) ABSTRACT

A new power supply topology is described consisting of an input h-bridge or half-h-bridge, a low coupling coefficient transformer such as an air core transformer, a secondary resonant circuit, and a voltage multiplier which includes a series output capacitance. The topology is advantageous for high voltages since the reduced coupling leads to large spacings reduced insulation requirements.

16 Claims, 6 Drawing Sheets

US 6,934,165 B2

LOOSELY COUPLED PARALLEL RESONANT CONVERTER

FIELD OF THE INVENTION

The field of the invention refers to high efficiency electrical power conditioning equipment which is used to power a variety of loads and it may be considered to be an AC:DC converter or a DC:DC converter.

BACKGROUND OF THE INVENTION

High voltage power supplies (voltages >100 V) are essential to such technologies as Radar, X-ray inspection, Cancer therapy, Corona processing, Semiconductor Fabrication, and a variety of other important fields. In creating a high voltage power supply using existing inverter topologies such as the Cuk converter, there are problems due to the energy in the stray capacitance, and due to insulation in the presence of a magnetic core. The core distances in a DC power supply—particularly at high voltage—are all constrained because the leakage inductance of the system must be small, and distance increases inductance since the field energy between windings depends on the distance between windings.

An ideal system would allow for increased insulation, reductions in the core material used, and improved handing of the capacitive energy stored between the primary and the secondary. Operation with reduced coupling coefficient has been described by Abramyan in the unique case of pulse charging of output capacitances. Details of such transformer designs have been proposed—for example by Crewson. Adler showed how to use loosely coupled transformers in a very specific application. A general method of creating improved high voltage power supplies would be desirable.

SUMMARY OF THE INVENTION

In our new topology, we use the series inductance of the transformer as part of the current limiting means. This allows us to separate windings to a greater degree than in existing transformers. The total inductance of the secondary is part of the secondary parallel resonant circuit which allows us to have very low total inductances—even air core secondary windings. Such windings allow us to design air core transformers without the constraint of a conductive core, and with much improved high voltage properties. Magnetic material can be eliminated, used only to shape fields, or used to make transformers in our topology.

The capacitive energy in the secondary of a high voltage transformer is highly problematic. It causes ringing in conventional circuits and excess voltages in the windings. By using a parallel resonant system on the secondary winding, the capacitive energy is used in the circuit design. In general, capacitance is added to the secondary stray capacitance, but it may not necessarily be added depending on the specific design.

DETAILED DESCRIPTION OF THE PREFERRED EMBODIMENT

Figure 1:
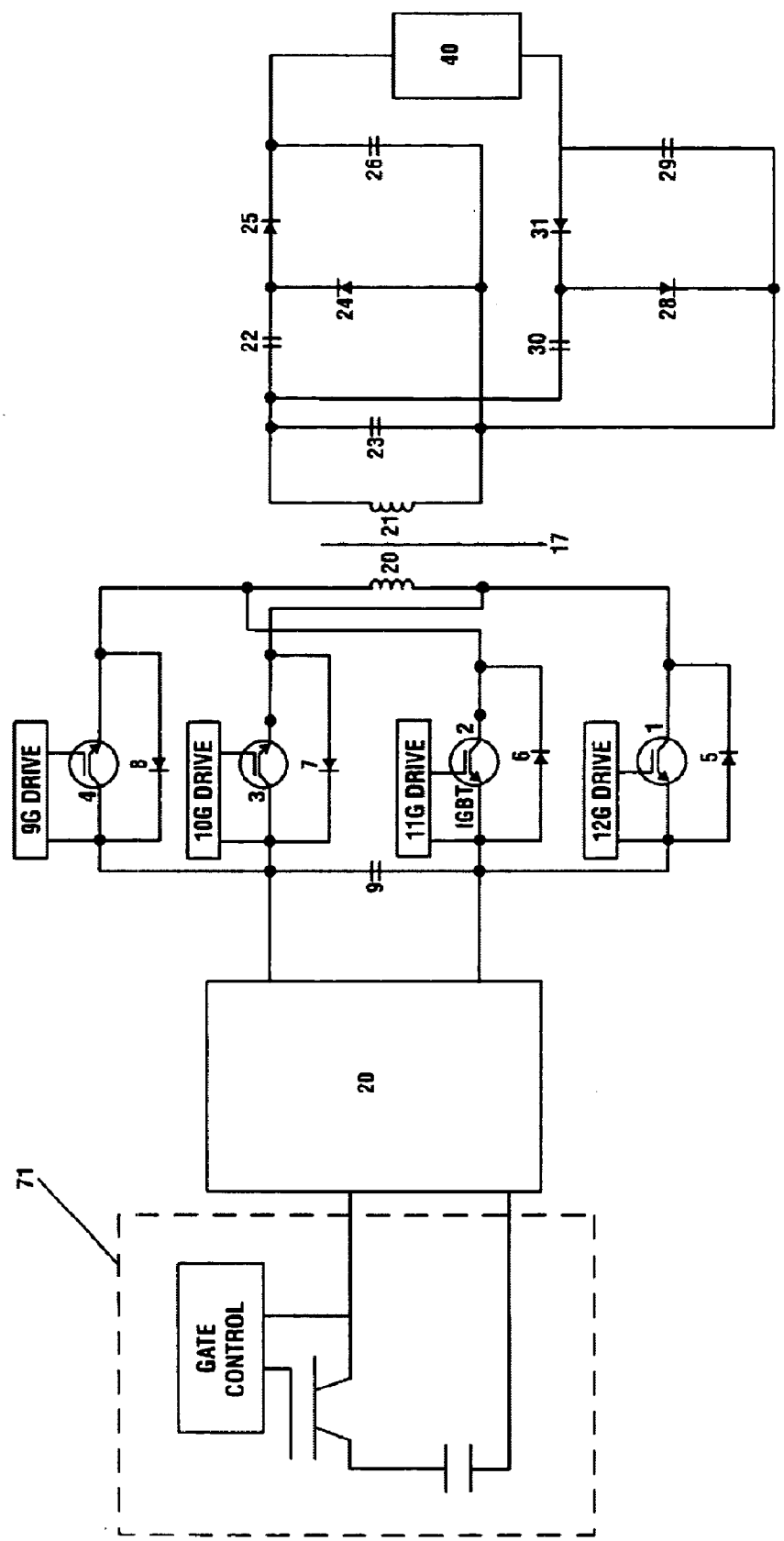
In FIG. 1 we show a circuit of the preferred embodiment with full H-bridge drive, and with both positive and negative multipliers.

In FIG. 1 we show a circuit schematic of our preferred embodiment. The input power 20 may be a rectifier array combined with an AC line, DC battery, rotating machine, or other DC source. The power is switched by IGBTs, FETs, or other solid state switches 1, 2, 3, 4. We switch 1 and 4, and 2 and 3 alternately to produce alternating, opposing currents and voltages through the transformer 17, 20, 21. The switches 1,2,3,4 are controlled by gate drive or other circuits 9,10, 11, 12. When switch pair 1,4 is turned off, the energy in inductance is recovered by 6,7, and when switch pair 2,3 is turned off, the energy in inductance is recovered by 5,8 to the main storage capacitance 9. The main storage capacitance provides energy for surges as the switches are turned on and off.

The transformer consists of a primary (20), secondary (21), and possibly a ground shield (17). The secondary (21) and the resonant capacitance (23) make up a resonant circuit which is somewhat separate from the primary due to the imperfect coupling of the transformer. The secondary current is limited by the voltage multipliers 22, 24,25,26 (positive side) and 30,28, 31,29 (negative side). The output is applied to the load 40 and rectifier/multiplier capacitors 26 and 29. In an alternative embodiment, a "buck" regulator 71 can be added to the power supply.

The arrangement of outputs can be used to create either a unipolar or bipolar charge with respect to ground. The ground shield is used prevent transient capacitive coupling between primary and secondary.

Figure 2:
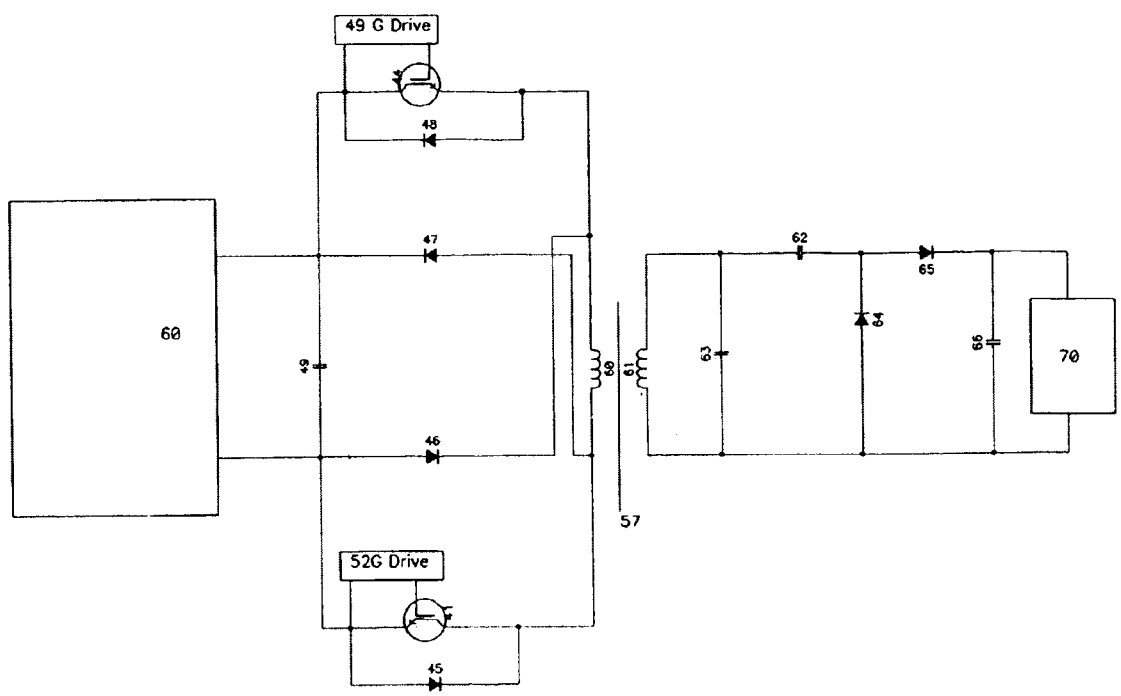
In FIG. 2 we show a circuit of the preferred embodiment in which we pulse only in one direction, and the system power is driven only in one direction.
Figure 5:
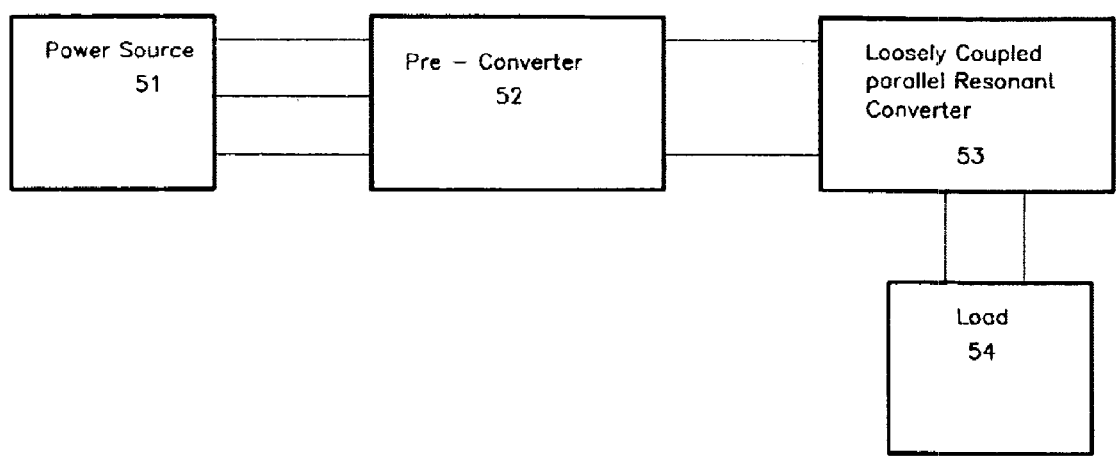
In FIG. 5 we show the combination of our converter with a preconverter.

The circuit is "phased" by controlling the applied frequency of the gate drive pulses to 9,10, 11, and 12 relative to the resonant frequency of the secondary $f=\frac{1}{2}p(L_2C_2)^{1/2}$. In our topology when the drive and secondary resonant frequencies are within 10%, and when the coupling is >0.6, the secondary circuit "back EMF" or induced flux reduces the current in the primary, which in turn reduces the current to be switched. In some cases the current to be switched can be arranged to be zero. The reduction in current past the peak of the waveform is shown in FIG. 5. The current is turned off before the peak in the secondary waveform In the "Half-H" circuit of FIG. 2, we can eliminate half the components of the full H-bridge because the magnetic fields are reset to zero and then inverted by the secondary parallel resonant circuit.

A challenge of our topology is that the secondary must carry an RMS current $V/(2L_2/C_2)^{1/2}$ which increases the amount of wire which must be used on the secondary to reduce losses. Such wire is inexpensive and easy to wind.

Figure 3:
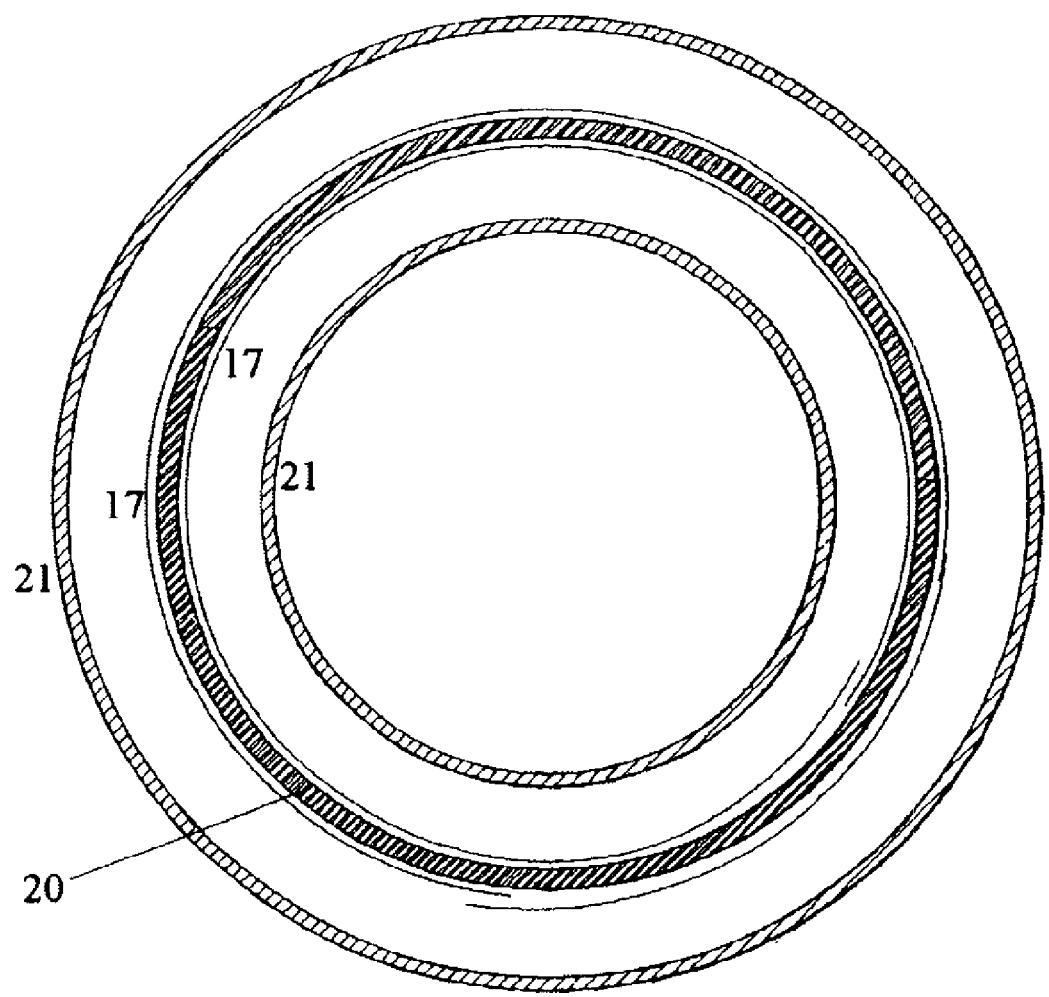
In FIG. 3 we show an air core transformer of the preferred embodiment with inner and outer secondaries and an intermediate primary.
Figure 4:
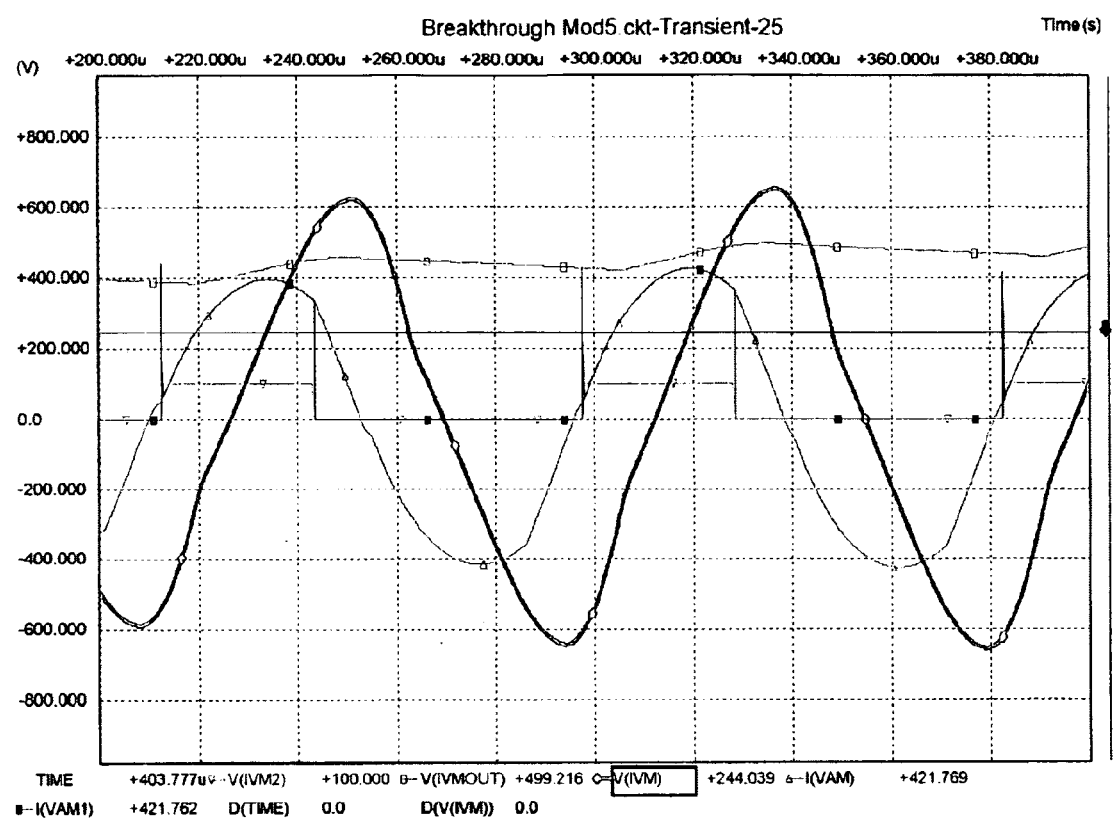
In FIG. 4 we show some waveforms from the operation of the system indicating the partial self-commutation property of the modulator, and the phasing of the signals. The larger oscillating waveform is the secondary voltage. The smaller oscillating waveform is the primary current. The upper nominal DC varying waveform is the output voltage on capacitors 26 and 29.

The simplest transformer geometry for the loosely coupled resonant transformer topology consists of solenoidal coils such as are shown in FIG. 3. The wire is wound in a spiral on a circular form as shown in a plan view in FIG.

3. The coupling is equal to the area ratio of the inner over the outer coil if there are inner and outer coils only. In the configuration of FIG. 3, the coupling coefficient is increased by approximately a factor of 2. Further spacing increases are possible with the geometry of FIG. 3.

Combination of our topology with a preconverter such as a buck converter or power factor correction circuit is shown in FIG. 5 where the sequence of power flow is from the power source 51 to the preconverter 52 to our parallel resonant converter 53 to the load 54.

Figure 6:
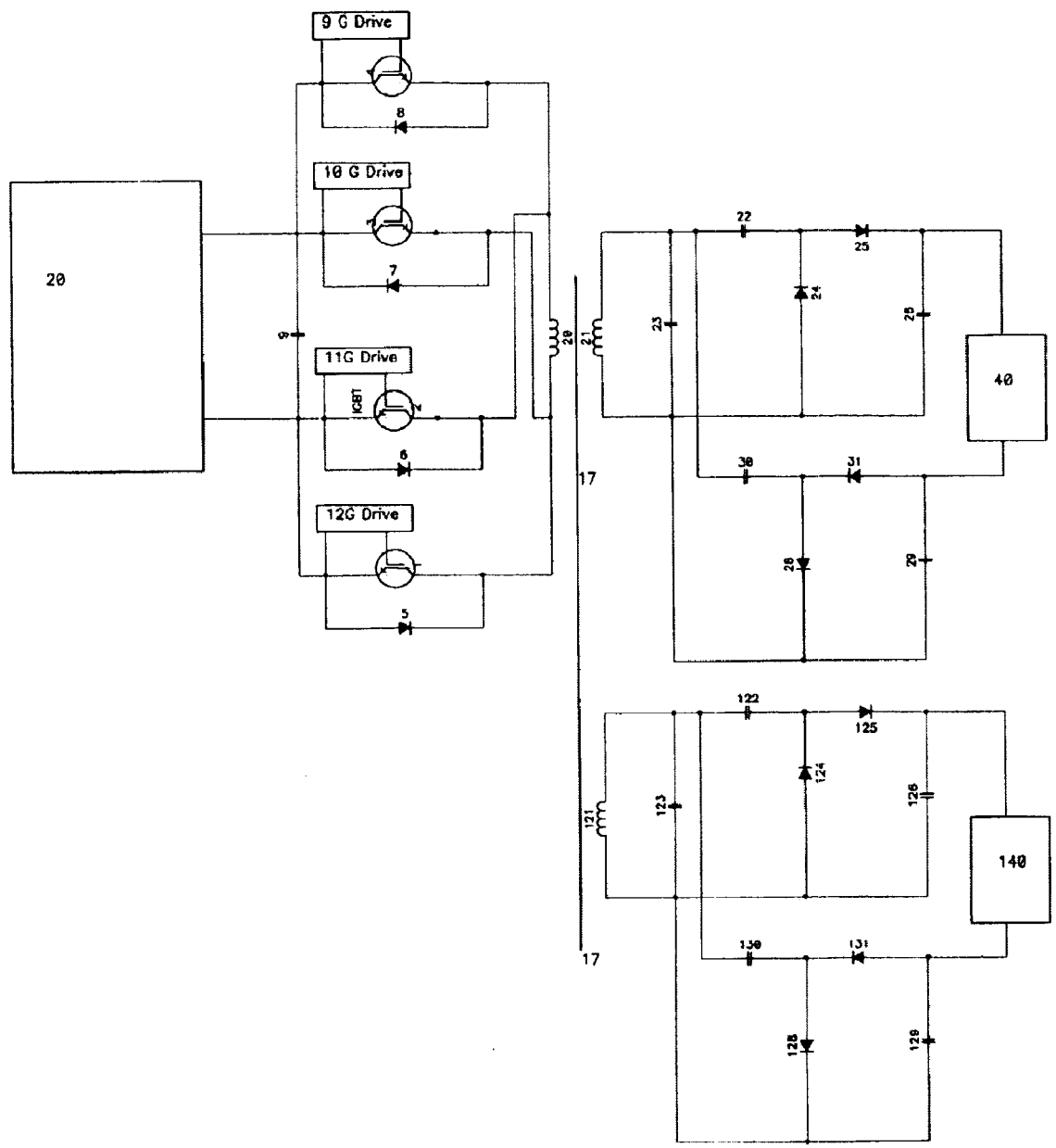
In FIG. 6 we show the use of multiple parallel secondaries.

We can use two separate secondaries with two separate functions as shown in FIG. 6. In FIG. 6 we add to FIG. 1 by having additional multiplier components 121, 122, 123, 124, 125, 126, 127, 128, and 129, and also a separate load 140. A particularly advantageous arrangement for high voltage is one in which the loads 40 and 140 are placed in series. Alternately 40 and 140 could be the cathode power supply and accelerating power supply of a linear beam tube such as a Klystron.

What is claimed is:

1. A power converter for AC/DC or DC/DC power transformation comprising:

an air core transformer with coupling k less than 0.95 and primary and secondary windings and further comprising a gap for high voltage insulation;

a primary switch;

a primary energy input;

a primary control circuit;

a secondary comprising a parallel resonating capacitor; and a voltage multiplier, wherein said voltage multiplier comprises part of a resonant circuit, and further comprising at least one capacitor for limiting the output current, and such parallel resonating capacitor comprising a secondary parallel resonant circuit.

2. The converter of claim 1 with the primary switch replaced by a full "H-bridge" circuit.

3. The converter of claim 1 in which a partial magnetic core or full magnetic core is used in the air core transformer making it conventional transformer.

4. The converter of claim 1 with the primary switch replaced by a partial "H-bridge" circuit.

5. The converter of claim 1 with a single primary switch and/or primary switch and snubber combination.

6. The converter of claim 1 wherein said air core transformer comprises a gap between said primary winding and said secondary winding larger than necessary for insulation between them for creating a series current limiting element.

7. The converter of claim 1 wherein the primary switch commutates at or near a current zero.

8. The converter of claim 1 wherein the primary control circuit frequency is controlled to match the effective resonant frequency based on the voltage feedback.

9. The converter of claim 1 in which the air core transformer comprises primary windings on an inside and an outside of the secondary.

10. The converter of claim 1 in which the air core transformer comprises secondary windings on an inside and an outside of the primary.

11. The converter of claim 1 wherein said transformer comprises a "ground shield" between the primary and secondary windings.

12. The converter of claim 1 further comprising "buck" regulator.

13. The converter of claim 1 wherein a primary control circuit output comprises bursts of pulses.

14. The converter of claims 1 in which the converter is preceded by a power factor correction circuit.

15. The invention of claim 1 wherein said air core transformer comprises a nonconductive core material.

16. The invention of claim 1 wherein said air core transformer comprises a partly conductive core material.

* * * * *